Oct. 8, 1963
A. M. MAYO ETAL
3,106,203
ANTI-BLACKOUT VALVE
Filed Aug. 10, 1959
2 Sheets-Sheet 1
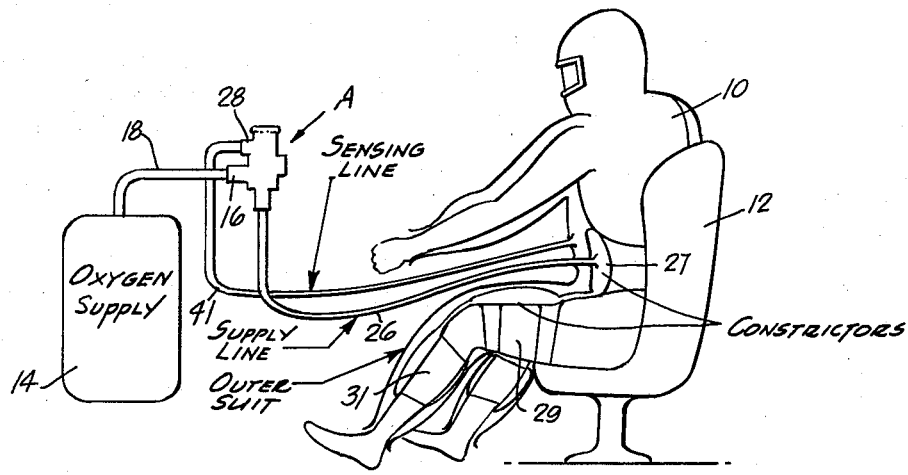
Fig. 1
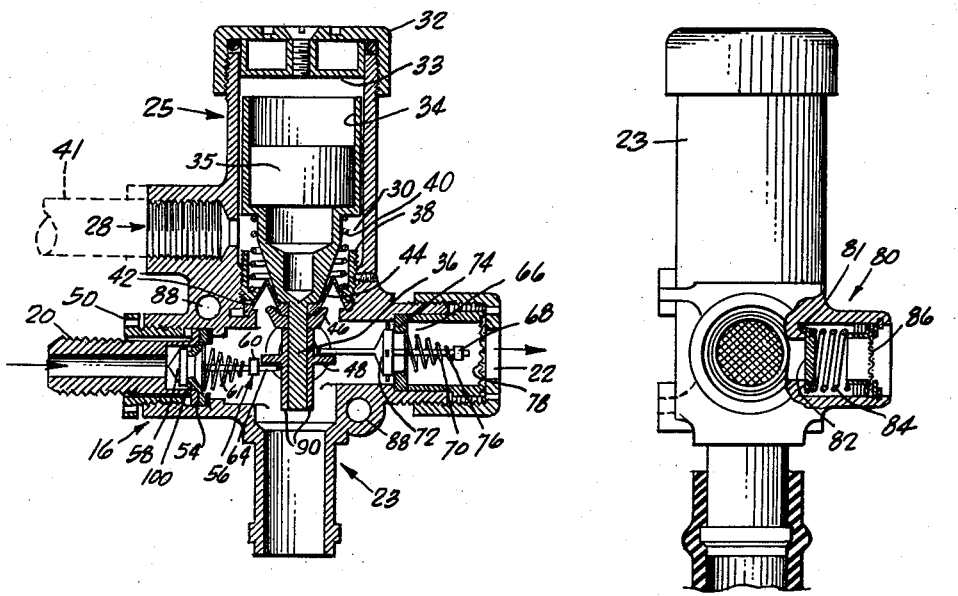
Fig. 2
Fig. 3
INVENTORS
ALFRED M. MAYO AND
BROWNING NICHOLS JR.
BY
Edwin Coates
ATTORNEY Oct. 8, 1963 A. M. MAYO ETAL 3,106,203
ANTI-BLACKOUT VALVE
Filed Aug. 10, 1959 2 Sheets-Sheet 2

INVENTORS
ALFRED M. MAYO AND
BROWNING NICHOLS JR.
BY
Edwin Coates
-ATTORNEY-

3,106,203
ANTI-BLACKOUT VALVE
Alfred M. Mayo, Palos Verdes Estates, and Browning Nichols, Jr., Culver City, Calif., assignors to Douglas Aircraft Company, Inc., Santa Monica, Calif.
Filed Aug. 10, 1959, Ser. No. 832,740
7 Claims. (Cl. 128—1)

This invention is concerned with the personal habiliments and accoutrements of combat aircraft pilots, who currently wear "anti-G suits," or pressurized coveralls to overcome the tendency of certain maneuvers, or aerobatic forces, such as tight turns or sudden "pull outs" from dives to throw the pilot's blood away from his head into his ventral region and into his legs and thighs. Such loss of blood from his head causes the pilot to lose consciousness, or to "black-out," with obviously catastrophic possibilities as regards the safety of the pilot and the integrity of the aircraft.

More particularly, the invention is converned with the valve, interposed between the pressure source and the "G-suit," and more particularly its accessories in the form of constrictive bladders, which automatically responds to these positive gravitational forces to supply a variable pressure to the suit accessories as a function of the varying gravitational forces needed temporarily to restrain the aforementioned flow of blood whereafter, the gravitational load having been removed by altering the attitude of the aircraft, the valve closes or relieves the excess pressure.

Such devices must maintain a suit accessory pressure of the order of 9 p.s.i. to 11 p.s.i. when the gravity load on the wearer is somewhat above 8G, in order to effectively retain the blood in the head and the upper part of the body.

Such valves further must "trip" automatically by acceleration, at valve inlet pressures ranging from 10 p.s.i. to 120 p.s.i., at low gravity loads on the wearer, for even at low loads blackout is possible under certain circumstances with certain individuals.

Leakage of the valve at high inlet pressures, of the order of 120 p.s.i., for example, and with the wearer under normal (1G) gravity load, must be undetachably low. At the same inlet pressure under gravity loads of 6G or higher, the leakage must be under .2 liter per minute.

No resonant frequency must occur in the system, due to the valve, throughout the range of 500 to 2500 cycles per minute, for chattering and malfunctioning would result.

Free flow must occur at relatively lower inlet pressures if the gravity load is correspondingly low, for obvious reasons.

Again, the ordinary anti-blackout valve is connected to the engine breather air arrangement in order to supply anti-G pressure gas to the suit. In addition to the fact that the pressure from this source varies, use of such source necessitates the employment of an air filter which is of such weight as to add an appreciable weight penalty to the system.

In the ordinary anti-black-out valve, to provide a gravity load resistant pressure in the pressure suit constrictors, an inertia plunger descends on a "pull-up" or like sharp maneuver of the aircraft, and, in divers ways, causes opening of a pressure-gas inlet valve so that the inlet pressure in a main chamber of the valve builds up to feed anti-G pressure to the suit constrictors. Now, in an unpressurized cockpit at high altitudes, with the pressure in the suit above cockpit pressure, at the commencement of a pull-up, pull-out or high speed turn the gas pressure in the chamber would be constrained, by the ordinary valve's construction, to equalize the pressure inside and outside the suit. This lack of pressure differential would not be effective to prevent the wearer's blood from leaving his head.

Contemporary anti-blackout valves are of such configurations that they cannot meet all these stringest requirements, but by virtue of certain novel concepts, including that of employing the automatically controlled oxygen supply of the aircraft, the present valve assumes a novel configuration and mode for anti-black-out types of valves. The present invention, in fact, provides a valve which actually complies with every one of these standards. As a consequence, in modern ultra-high speed combat aircraft, for example, the danger of blackout, even in the sharpest turns and steepest pull-outs, is quite materially reduced. Also, since a number of types of combat aircraft carry a plurality of crew-members, each of whom must be provided with anti-blackout valves and conduitry therefor and since previous such valves were far from light or compact, a definite and profitable reduction in the weight-penalty of such systems is desirable. In fact, by virtue of the novel re-arrangement of valve components, the size and weight of such valves are reduced, the weight being reduced, for example, from 2 lbs. to about .4 lb. per valve. As a consequence the present valve can, if required, be mounted directly to the pressure suit and be carried thereby. In any event, it imposes very little weight penalty.

The aforementioned deficiency with reference to the lack of pressure differential between the suit's pressure and the cockpit's pressure is also rectified, by novel "sensing" means in the valve. The inlet of these sensing means enters the valve above the diaphragm and can be flow-connected to the "reading" port in the suit so as to tap off a pressure from the pressurized suit, thus reading a pressure lower than that of the main pressure source, and referencing the pressure above the diaphragm to the suit's actual pressure, rather than to the cockpit pressure. If the crewman is wearing an ordinary, unpressurized suit, however, the pressure above the diaphragm is obtained from the space in the cockpit, and not from said reading port.

Thus, in the former case, if the pressure in the suit is, say 3 p.s.i. so will be the pressure above the diaphragm and the flow path connecting the gas-pressure source to the constrictors will build up to a proper pressure over and above that being applied to the rest of the body of the pilot. As one consequence, the relative pressure acting on the crewman in pullouts, etc., will retain their proper ratios.

Essentially, the present novel configuration comprises a valve casing of a generally cruciform shape, the upper, or first, arm of the cruciform shape including, essentially, a spring-loaded inertia plunger and a "reference pressure inlet" thereinto located in the upper arm below the "rest" position of the plunger. The plunger terminates downwardly in an actuator stem which works vertically in a lower chamber—the lower arm of the cruciform article. In this lower chamber, a pair of tilt, or "tip," valves is mounted to protrude laterally therein to and into juxtaposition with an annular actuating collar on the lower portion of the stem of the plunger group. A first one of these valves constitutes an inlet-control valve and is mounted in a laterally extending inlet passage having a seat for the outwardly protruding head of this valve. Axially opposite this first tip valve is a somewhat similar valve which controls the exhaust from the chamber. A constrictor-feed, or supply, neck forms the fourth arm of the cruciform article and is adapted for connection to the conduitry to the constrictors. Disregarding, temporarily, the reference feature's function, when a positive acceleration by inertia urges the plunger downwardly, the collar thereon contacts the first valve, opens same and establishes flow between the valve and the pressure suit. Upon return of the plunger to its "rest" position, said collar contacts the second valve and establishes airflow therethrough to the cockpit or atmosphere. As aforesaid, the present reference feature and connecting conduitry rectify the discrepancy with reference to the lack of pressure differential between the suit's actual pressure and the cockpit's pressure.

By virtue of this arrangement, the pressure is constrained to always work out to the constrictors of the proper value after which the inlet tilt valve is automatically closed. This results from the fact that the top surface of the main chamber of the valve is a flexible diaphragm and the pressure over the diaphragm's area is balanced against the weight of the plunger-piston unit multiplied by the acceleration of gravity. Therefore, if the number of G's be doubled, so will the pressure be doubled; vice versa, twice the number of G's will require twice the pressure to support the piston. The two variables, the G's and the main chamber pressure, are on opposite sides of the diaphragm and, acting in mutual apposition, they hence vary linearly, or directly, with obvious consequences.

When the plunger is at its uppermost position, the exhaust valve is held open to assure evacuation of the chamber.

To meet the contingency that one, or both, of the tip valves might perchance jam or otherwise become inoperable, a safety valve is provided in the lower chamber, at spatial right angles to the plane of the inlet valve and of the outlet valve and serves well to prevent accumulation of excessive detrimental pressure in the lower chamber by venting same upon the occurence of a predetermined excess pressure, thus venting the lower chamber. Such excess would certainly occur if the exhaust tip valve should jam shut. Further, this relief valve can be set to open at a sufficiently high predetermined pressure so as to permit suit-pressure to attain at least a preselected high operating pressure, say 9–11 p.s.i.

Other accomplishments and concepts of the invention will either be set forth hereinafter or become apparent as this disclosure proceeds.

One of the presently-preferred embodiments of the inventive concepts is, by way of example only, illustrated in the accompanying drawings and will be described hereinafter in conjunction with same.

In these drawings:

FIG. 1 is a somewhat diagrammatic view of the general arrangement of the present valve and system with a pilot wearing an anti-blackout suit;

FIG. 2 is a vertical, central section of the valve per se with the load being initiated at the beginning of a maneuver, the exhaust valve having just closed, that is, in a state of equilibrium;

FIG. 3 is a side view of same, taken from the right hand side of FIG. 2;

Figure 4:
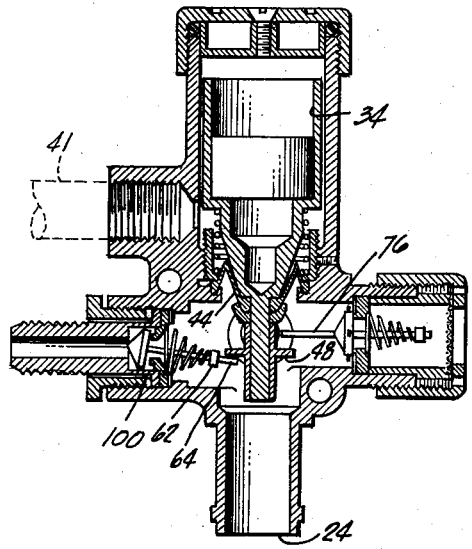
FIG. 4 is a view similar to that of FIG. 2 but showing the inertia plunger depressed by the positive acceleration of a steep pull out, thus opening the inlet tip valve and establishing "referenced" flow to the constrictors of a proportioned amount of pressurized gas, such as air or oxygen.
Figure 5:
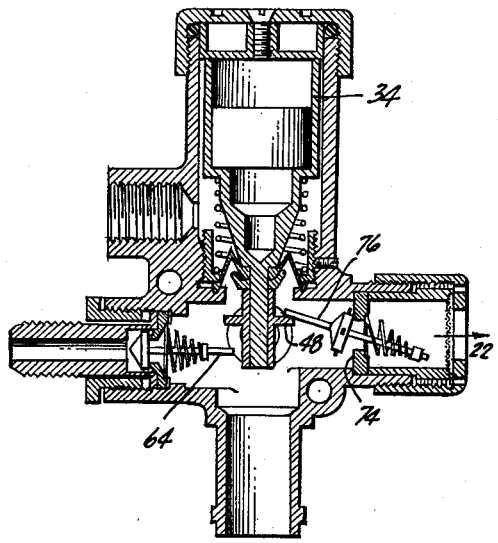
FIG. 5 shows the condition with the plunger fully up and the exhaust valve open.

Referring now in detail to the exemplificatory embodiment depicted in the drawings, a crewman 10 is seated in a seat 12 in a cockpit, which is pressurized at about 8 p.s.i., maximum. In the cockpit, or below its floor, is the aircraft's conventional source 14 of pressurized oxygen. The oxygen pressure in 14 is, as usual, automatically controlled by well-known means, not shown and not consituting a positive part of present valve. Thus, by rendering the system independent of the aircraft power plant's bleed off, I am enabled to provide a new and improved configuration of anti-blackout valve.

As shown in FIG. 1, a first arm or valve inlet extension 16 is connected by conduit 18 to the pressurized oxygen supply 14, and conduit 26 is connected to the constrictor 27 at the ventral cavity region, and the constrictors 29 and 31 at the thighs and legs are interconnected to each other and to constrictor 27 by small conduits. A spanner nut 50 engages the first arm coaxially around the nipple 20, abutting annular flange 54 provided on the inner end of the nipple 20.

The fourth arm or extension 25 contains inertia responsive means for effecting opening and closing of the inlet and outlet of the valve, as well as means for "referencing" the suit with respect to cockpit pressures, as and for the purposes mentioned above. Arm 25 is completely segregated, as to fluid flow, from the other arms by means of a diaphragm arrangement 44. The generally circular and upwardly convex diaphragm 44 extends transversely across the lower end of arm 25 and is clamped by the lower end of the plunger seat 38 at its beaded periphery 42 against the circular edge of the opening from arm 25 into the central chamber of the valve. The central aperture in the diaphragm 44 is seated airtightly to the stem 36 and is supported by a washer 46. A coiled return spring 40 is interposed coaxially between the lower face of the plunger 34 and the clamp and seat 38.

An annular valve operating shoulder 48, carried by a sleeve 90 which is screwed onto the stem 36 for vertical adjustability, is carried upwardly and downwardly with the stem 36 when the inertia plunger 34 is moved correspondingly.

At inlet 16 an annular valve-seat 100 is mounted coaxially at the inner end of the nipple 20 and a normally closed obturator or inlet valve 56 of the tilt, or "tip," variety has the base of its conical head 58 seated on seat 100. An inner seat 60 for a valve spring 61 is provided in arm 16, there also being an outer seat or collar 62 on stem 64 for spring 61.

In a plane slightly above that of the inlet valve, and carried by the exhaust arm, there is provided a similar normally closed obturator or tilt valve for controlling the exhaust. This outlet valve group includes a stem 76 having an outer seat 68, a tapered helical spring 70 contacting inner seat 66, and a conical head 72, the inner face of the head normally seating on an annular seat 74 in the body 21 of the valve.

Transversely disposed in the exhaust arm adjacent exhaust 22 is a wire mesh screen 78 for preventing the entry into the valve of foreign matter such as dirt particles which might have been entrained from the cockpit.

The upper end of hollow arm 25 is closed by a removable cap 32 centrally carrying a pressure head 33.

In the chamber 30 defined between diaphragm 44 and the pressure head 33, there is coaxially mounted a hollow inertia plunger 34 having a stem 36 protruding downwardly therefrom through the diaphragm and into the central portion of the valve. When necessary, an inertia weight 35 can be located in the plunger.

Thus, the pressure fed to the constrictors 27 and 31 is automatically constrained to always be at the proper, or needed, value by the automatic closing and opening of the inlet and exhaust valves 58 and 72. These results are due to the fact that the pressure throughout the area of the diaphragm is balanced against the weight of the actuator unit times the G's. Also, the two variables, the G's and the main chamber pressure, lie on the opposite sides of the diaphragm, act in opposition, and vary linearly. When the G-load is reduced, the pressure in the chamber, acting upwardly against the diaphragm 44, will raise the actuator until the actuator shoulder 48 contacts and raises the inner end of stem 76, opening the exhaust valve 72 and relieving the excess pressure in the constrictors.

As best seen in FIG. 3, safety means are provided to prevent pressure accumulation in the main, or central, chamber or in the constrictors in case the inlet tilt valve should become inoperative in open position, as by jamming due to foreign matter thereat. To meet this contingency, a relief valve 80 is disposed substantially as a stub fifth arm of the casing, in the region of the central chamber with the axis of 80 rectangularly intersecting the transverse axis of the chamber from the rear side of the casing. The valve 80 comprises a hollow cylindric wall coaxially containing an annular seat 81 and valve head, or closure, 82, normally maintained closed by a helical spring 84. The spring seats at the opposite end upon the conventional washers shown and a fine mesh wire screen 86 is disposed transversely of the hollow stub near the outer end thereof, being anchored in place by the washers, or retainer rings, shown.

Thus, this safety valve unit lies in a plane extending at right angles to that occupied, substantially, by the inlet arm, the exhaust arm or extension and the suit-supplying arm or extension and hence serves well to relieve the build-up of excessive pressure in the main chamber and in the constrictors, if such should occur.

Suit-pressure reference means 28—40, etc., are provided in order to achieve the desired pressure increase in the constrictors. These means constitute a threaded socket or inlet-outlet 28 opening into the upright arm or extension of the valve above the diaphragm 44. A conduit 41 is coupled at its one end to the socket 28, its other end being coupled to the "reading" fitting or other suitable opening in the suit.

Ordinarily, these sensing, or reference means, tap off pressure directly from the suit, thus receiving a pressure lower, somewhat, than that in the main source of pressurized air. It also references, or compares, the pressure above the diaphragm to the actual pressure in the suit, rather than to the cockpit pressure. Thus, if the pressure in the suit is 3 p.s.i., this will be the air pressure above the diaphragm. But, by virtue of its additional pressure on the diaphragm, this arrangement will cause the actual pressure in the constrictors at the time of a pull out, when the inertia plunger functions, to build up over the pressure in the pressure-suit to the proper relative pressure to ensure appropriate functioning of the constrictors 27, 29 and 31.

Accordingly, the relative pressures acting on the crew-man in "sharp" maneuvers will always be automatically adjusted to the values necessary to prevent the flow of blood to the ventral cavity and the lower limbs.

Figure 6:
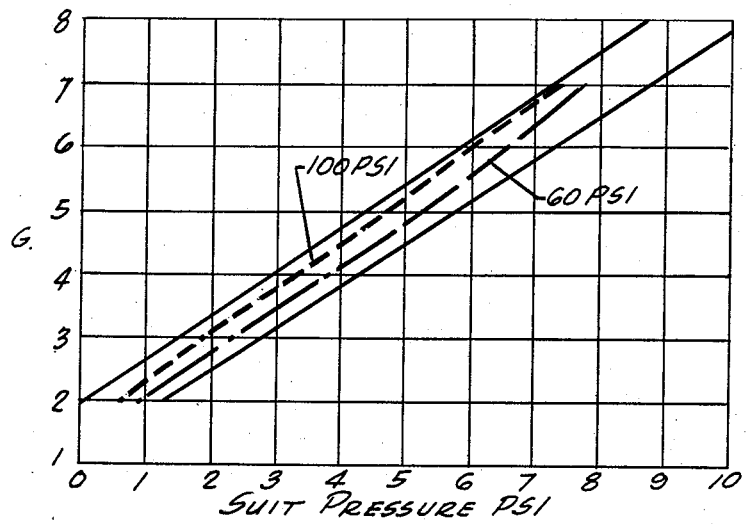
FIG. 6 is a graph illustrating the relationship, maintained by the valve at 60 and 120 p.s.i. inlet gas pressure, between the gravity load, G, and the actual pressure in the suit.

In FIG. 6, it is graphically demonstrated that the valve maintains the suit pressure at an effective value, under load as high as 9G and with inlet pressures varying from 60 p.s.i. to 100 p.s.i.

Although certain specific geometrical shapes, certain parameters, etc. have been employed hereinabove for purposes of clarity, the actual scope of the invention is that which is defined by the sub-joined claims.

We claim:

1. A fluid-flow controller in combination with a pressurized suit having pressural constrictors, comprising: a casing; fluid inlet means in the casing being in communication with the constrictors; normally closed flow-obturator means in said inlet means and having a portion extending substantially transversely of said casing, said portion being positioned for engagement to open the obturator means and admit fluid into the casing; fluid-exhaust means in the casing; normally closed flow-obturator means in said exhaust means and having a portion thereof extending substantially transversely of the casing in a plane above the first said portion, the second said portion being engageable to open the exhaust obturator means; and inertia operated means in said casing and having a portion extending and movable substantially at right angles to both said portions of both said obturator means, said portion of said inertia operated means including actuator means for engaging and moving said portions on both said obturator means, movement of said inertia operated means in one direction first effecting opening of the first said obturator and effecting opening the second said obturator means on movement of the inertia operated means in the opposite direction; and means in the casing subjected to the pressure differential between suit pressure and constrictor pressure for pressurally reacting upon the actuator means in response to the difference in fluid pressure between the general suit pressure and the pressure at said constrictors to effect the appropriate pressure differential between the constrictors and pressure-suit.

2. A controller according to claim 1, in which there is a safety release means in said casing for said fluid, said means being arranged to be operated by excess pressure in the casing so as to automatically discharge from the casing any excess-pressure over the highest operating pressure.

3. A controller according to claim 1, in which the first-said obturator means consists of a spring-loaded tilt valve normally seated in the inner end of the inlet means and in which the second-said obturator means consists of a spring-loaded tilt valve seated in the inner end of the exhaust means.

4. A controller according to claim 1, in which each of said obturator means consists of a spring-loaded tilt valve and in which said inertia operated means includes a spring-seated plunger extending into juxtaposition with said tilt valves, said plunger operating to open said obturator means in alternation.

5. A controller according to claim 1, in which each of said obturator means consists of a spring-seated tilt valve and in which said means pressurally reacting is a flexible diaphragm extending transversely of the casing and arranged to airtightly separate the casing region containing the tilt valves from that distal region of the casing that contains the inertia operated means; and in which said inertia operated means includes a plunger extending substantially airtightly through said diaphragm into operative juxtaposition with both said tilt valves.

6. In combination, a pressure suit; a valve casing having a hollow medial portion and a plurality of hollow extensions protruding outwardly from said medial portion; a first one of said extensions having normally closed obturator means operable to admit fluid into the medial portion, a second one of said extensions constituting an outlet passage for the fluid from the casing; a pressural-constrictors communicating with the outlet passage; a third one of said extensions including normally closed obturator means mounted therein and openable to exhaust fluid from casing to atmosphere; and a fourth one of said extensions including a spring biased inertia actuator means for said obturators, said actuator means being movable to first contact the first obturator means upon movement of the actuator means in one given direction and being movable to contact the second obturator means upon movement of the actuator means in the opposite direction; and diaphragm means in the casing in pressure communication on opposite sides thereof respectively with the outlet passage and the pressure suit, said diaphragm being connected to the actuator means and reacting thereon to modulate the movement of the actuator means in accordance with the difference between the suit pressure and constrictor pressure.

7. An inertia responsive flow controlling device in combination with a pressurized suit and constrictor means therein, said device including a casing having a medial hollow portion, said medial portion having a plurality of hollow arms extending outwardly therefrom; a first one of said arms constituting an inlet passage and including a normally closed tilt valve controlling ingress of pressurized gas through the first said arm; a second one of said arms constituting an exhaust passage and including a normally closed tilt valve controlling exit of air through the second said arm, said valves being in said medial portion substantially opposite each other; operating portions of said tilt valves extending substantially transversely of said hollow medial portion, the second tilt valve lying somewhat above that of the inlet passage valve; a third arm leading air onwardly toward the constrictor means and being continuously open; a fourth arm including actuator means extending transversely of said operating portions of the valves for engaging and moving the said operating portions, said actuator means normally being biased out of contact with said valve operating portions and being responsive to forces resulting from changes of acceleration of the actuator means so as to first contact the valve operating portion of the first said valve upon movement of the actuator means in one direction and to contact the valve operating portion of the second valve upon movement of the actuator means in the opposite direction; and an airtightly mounted diaphragm means dividing the casing in the vertical direction into upper and lower regions, said upper and lower regions being in communication respectively with the pressurized suit and the constrictor means, said diaphragm means being arranged to react on the actuator means so as to modulate the forces on the actuator means and regulate the pressure at the constrictors.

References Cited in the file of this patent

UNITED STATES PATENTS

| | | |
|---|---|---|
| 2,617,408 | Clark | Nov. 11, 1952 |
| 2,622,609 | Moller | Dec. 23, 1952 |
| 2,823,687 | Gabriel | Feb. 18, 1958 |